United States Patent [19]

Dancila et al.

[11] Patent Number: 5,791,601
[45] Date of Patent: Aug. 11, 1998

[54] APPARATUS AND METHOD FOR AERODYNAMIC BLOWING CONTROL USING SMART MATERIALS

[76] Inventors: D. Stefan Dancila, 3062J Spring Hill Rd., Smyrna, Ga. 30080; Erian A. Armanios, 486 Guilford Cir., Marietta, Ga. 30068

[21] Appl. No.: 517,951

[22] Filed: Aug. 22, 1995

[51] Int. Cl.⁶ ........................................ B64C 21/04
[52] U.S. Cl. .................... 244/207; 244/52; 244/17.25; 416/20 R; 416/24
[58] Field of Search .................... 244/213, 52, 207, 244/208, 75 R, 7 R; 60/527–529; 251/129.06, 129.17, 11; 416/20 R, 90 R, 24

[56] References Cited

U.S. PATENT DOCUMENTS

| | | | |
|---|---|---|---|
| 2,886,264 | 5/1959 | Seager | 244/207 |
| 3,005,496 | 10/1961 | Nicols | 244/207 |
| 3,066,894 | 12/1962 | Davidson | 244/207 |
| 3,745,984 | 7/1973 | King | 251/11 |
| 3,964,838 | 6/1976 | Spargo | 416/20 R |
| 4,014,481 | 3/1977 | Daikeler et al. | 244/213 |
| 4,137,008 | 1/1979 | Grant et al. | 416/20 |
| 4,200,252 | 4/1980 | Logan et al. | 244/17 |
| 4,508,314 | 4/1985 | Hemme | 251/11 |
| 4,573,871 | 3/1986 | Krauss et al. | 416/20 |
| 4,626,171 | 12/1986 | Carter, Sr. et al. | 416/90 |
| 4,711,415 | 12/1987 | Binden | 244/7 R |
| 4,948,068 | 8/1990 | VanHorn | 244/17 |
| 4,966,526 | 10/1990 | Amelio et al. | 416/90 |
| 5,295,509 | 3/1994 | Suto et al. | 251/129.6 |
| 5,318,268 | 6/1994 | Cox et al. | 60/529 |
| 5,353,828 | 10/1994 | Troscinski | 60/529 |

Primary Examiner—Galen L. Barefoot
Attorney, Agent, or Firm—Isaf, Vaughan & Kerr

[57] ABSTRACT

A method and apparatus for controlling the blowing of compressed air from an aerodynamic structure such as an aircraft wing or helicopter rotor blade and thus controlling the aerodynamic properties of the wing comprises a narrow slot (13) in the upper surface (15) of the structure near its trailing edge (14). Inside the wing (12) is a chamber (23) that is connected to the narrow slot (13) in the wing surface (15). The chamber (23) houses a compressed air conduit (16) for supplying and holding compressed air. A passageway (25) connects the conduit (16) to the slot (13) in the upper surface (15) of the wing (12). The lower wall (27) of the passage (25) has a slit (32) allowing a shutter (31) to move selectively into the passage (25) and obstruct the flow of compressed air through the passageway (25). The shutter (31) is attached to a smart material actuator comprising a piezo-electrical bender (29). When a control voltage is applied to the bender (29), the bender (29) will bend. The bending of the bender (29) causes the shutter (31) to move up into the passage (25) and obstruct the flow of compressed air. In this way, the flow of air out of the slot (13) in the wing surface (15) may be dynamically controlled by application of selective control voltages to the bender (29).

9 Claims, 1 Drawing Sheet

APPARATUS AND METHOD FOR AERODYNAMIC BLOWING CONTROL USING SMART MATERIALS

FIELD OF THE INVENTION

The present invention relates generally to the modification and control of flow around a body immersed in a fluid through the use of fluid jet blowing from openings (orifices or slots) on the surface of the said body and the use of smart materials for the purpose of controlling the characteristics of the said blowing.

BACKGROUND OF THE INVENTION

The flow field around lifting surfaces, such as aircraft wings and helicopter rotor blades, determines the pressure distribution over these surfaces and, therefore, determines the resulting aerodynamic forces and moments acting upon such surfaces. The modification and control of those forces and moments requires, therefore, modification and control of the flow field.

A number of methods of controlling the fluid flow around wings and rotors have been proposed and implemented. In the field of fixed wing aircraft, the most common method for controlling the flow, and, consequently, controlling the forces generated by the wing, is the use of a movable trailing edge surface, usually in the form of a flap. Basically, moving the trailing edge surface downward increases both the camber and the angle of attack of the wing and causes the negative pressure distribution along the upper surface of the wing to increase in intensity. Thus, the lift force exerted on the aircraft is increased.

This solution, however, has a number of known disadvantages. Firstly, the trailing edge surface needs to be actuated, which results in weight increase and added mechanical complexity as well. Secondly, when rapid movements of the trailing edge surface are required, limitations arise due to inertia and power/force limits of the actuating system. While not being prohibitive in the case of fixed wing designs, these issues virtually eliminate the option of using flaps or other trailing edge surfaces on a moving wing such as the rotor blades of a helicopter.

Alternate methods for controlling the fluid flow around aerodynamic surfaces have been investigated. The blowing of fluid jets tangentially from one or more slots located on the surface of a wing to control the flow patterns about the wing has been established as a viable solution. The method is generally known as airfoil circulation control through blowing. Depending upon its characteristics, tangential blowing can be used to achieve two goals. The first goal is to energize the flow in the vicinity of the surface, known as the boundary layer and, therefore, delay the onset of flow separation and its adverse stalling effect. The second goal is an increase in the lift generated by the wing through an increase in the bound circulation of the airfoil. In this second case, blowing is performed over a trailing edge modified from a sharp point to a smoothly curved Coanda surface. When fluid jets are blown tangentially along the surface of a wing fitted with a Coanda surface at the trailing edge, the blown jets and the adjacent flow will follow the Coanda surface until the balance between the pressure variation normal to the surface and the centrifugal force exerted on the jet is lost. The effect is to cause a change in the position of the stagnation points, a modification of the entire flow pattern, and a corresponding modification of the pressure distribution along the surface of the wing. The changes in pressure distribution and, consequently, the changes in aerodynamic forces and moments can be in this case substantially higher compared to the case of a trailing edge surface. Blowing has, therefore, potential as an alternative to trailing edge surfaces, particularly where the latter solution is not practical, such as in controlling the lifting properties of helicopter rotor blades.

Both steady and unsteady blowing have been investigated, and certain benefits of unsteady blowing have been identified. One challenge for those skilled in the art has been developing effective methods of generating and controlling the characteristics of the jet blown from a wing or rotor blade.

A recent attempt to control the blowing of compressed air from a wing is represented in the disclosure of U.S. Pat. No. 4,626,171 to Carter, Sr., et al.. The method taught by Carter employs a chamber filled with pressurized air, which is ejected through a slot near the trailing edge of the wing. The air is expelled from the slot and travels along the wing surface and around the Coanda surface at the wing's trailing edge. Thus, the flow pattern about the wing is modified as discussed above. To control the blowing, Carter discloses the use of large screws to adjust the maximum opening size of the blowing slot and thus control the rate at which compressed air is expelled from the slot.

The pressure of compressed air inside the chamber controls the deflection of a portion of the slot opening thereby controlling the range of slot opening sizes up to the maximum set by the large screws. The pressure in the chamber directly controls the size of the slot opening. Thus, the rate at which the compressed air is expelled is increased by increasing pressure in the chamber and decreased by decreasing pressure in the chamber.

An initial difficulty with the system disclosed in the Carter patent is that the response time of the system is very large. If one wishes to modify the normal flow about the wing one must increase the rate at which compressed air is expelled from the slot by increasing the size of the slot opening. This in turn requires an increase in the pressure inside the chamber and substantial elapsed time for the pressure to build to a sufficient level to bend the portion of the wing forming the movable part of the blowing slot. The response time of a control input to decrease the slot size by decreasing the pressure in the chamber may be even longer. Reducing the slot opening size requires bleeding pressure from the chamber and this process often takes several seconds to complete. Such slow response times and the inherent inaccuracies in measuring and regulating chamber pressure prohibit use of the system described in Carter for helicopter rotor blades or other applications requiring rapid cyclical blowing to modify airflow patterns at rapid rates.

Other attempts to control blowing from aircraft wings to control lift have led to mechanical control mechanists. U.S. Pat. No. 4,966,526 to Amellio, et al. discloses such a mechanical system for controlling the slot size and thus the rate of blowing from the slot. The Amellio patent illustrates several embodiments using a camming system to alter the size of the slot opening mechanically. This mechanical system, however, is bulky and as such can not be used in many applications. Additionally, the weight penalties for this system are substantial. Just as with most mechanical systems, maintenance and installment costs are also typically quite high. Finally, response time is not dramatically improved over the Carter Patent discussed earlier. Not only would such response times be prohibitively slow for use of this system with a helicopter rotor blade, the extreme mechanical complexity required at the rotor hub to cycle the control system at rotor rates would be prohibitive.

In addition to all the inadequacies with the prior art discussed above, there are other, more general shortcomings of the various systems for controlling blowing disclosed in the prior art. Most such systems depend on a thin spanwise slot, i.e. a slot that extends substantially the entire length of the wing, to deliver the air stream out of the wing surface. As such, there is no effective means for controlling the airflow independently at different points along the slot or along the wing. In other words, the air flow out of the slot cannot be varied as a function of position along the wing span. Any attempt to do so would greatly increase the mechanical complexity of the system.

Since mechanical flaps are not practical for rotor blades, helicopters and other rotorcraft historically have used a swashplate system located at the rotor hub. Through such a system, the rotor blades of the helicopter are cyclically pitched as they travel around the rotor hub. The result is a changing of each rotor blade's relative angle of attack as a function of its rotary position. This, in turn, changes the airflow and lift characteristics of the blades as they travel around the rotor hub. While swashplate systems have been successful and are used in virtually all commercial and military helicopter designs, they are nevertheless plagued with inherent problems primarily because the mechanical complexity of a swashplate system renders it extremely difficult and expensive to maintain. In addition, the high cycle rates required induces substantial mechanical vibration and noise in the aircraft and stresses the mechanical components of the entire drive system.

Thus, there exists a need for a method and apparatus for controlling the blowing of air over lifting surfaces that overcomes the problems of the prior art by providing a system with reduced mechanical complexity, high reliability, and fast response time. It is to the provision of such a method and apparatus that the present invention is primarily directed.

SUMMARY OF THE INVENTION

It is an object of the present invention to overcome the deficiencies and inadequacies of the prior art as noted above and as generally known in the art.

Another object of the present invention is to provide a method of controlling the blowing from an aircraft wing or helicopter rotor blade that embodies a minimum of mechanical complexity.

A further object of the present invention is to provide a mechanism for controlling aerodynamic blowing that can respond to control inputs fast enough to be used in conjunction with helicopter rotor blades.

Another object of the present invention is to provide a mechanism for controlling blowing that can be used to generate unsteady blowing while using a plenum with a substantially constant pressure as the source for the blowing jet.

Another object of the present invention is to provide a mechanism for controlling blowing wherein the blowing may be independently controlled at different spanwise positions along the wing or rotor.

These and other objects are realized through the present invention, which, briefly described, comprises a method and apparatus for controlling the blowing of compressed air from an aerodynamic surface such as a wing or helicopter rotor blade to achieve modification of the aerodynamic characteristics of the blade. The method comprises providing a source of compressed air that communicates with one or more slots or other outlets at a selected location on the blade so that air can be blown from the slots or outlets. The characteristics of the blowing, including activation and de-activation, the magnitude, and possibly the direction of the blown jet, are controlled by a valve means adapted to interrupt or otherwise affect the compressed air stream provided to the slot. The valve means, in turn, is activated and controlled through the use of a smart material actuator.

DEFINITION OF TERMS

Within the scope of the present patent application, the term "smart material" is used for any substance in a solid state that exhibits a coupled mechanical-nonmechanical behavior that can be used to generate a straining of the said substance by means other than mechanical loading. A list of smart materials includes, but is not limited to, the following:

1. Piezoelectric materials.
2. Electrostrictive materials.
3. Magnetostrictive materials.
4. Shape Memory Alloys.

Within the scope of the present invention, shape memory alloys are defined as materials which strain when a microstructural phase change in produced through a temperature change. These materials generally may exhibit a large deformation, but have large time constants. Magnetostrictive materials, on the other hand, are defined as materials which strain when a magnetic field is applied. The presence of strong magnetic fields may not be desirable in certain applications.

Within the scope of the present patent application, the term "smart material actuator" is used for any device that consists of, or contains, or makes use of a smart material, or a combination of smart materials, or a combination of smart materials and conventional materials to achieve a controlled change in dimensions and/or shape of the device under the effect of one or more controlled nonmechanical inputs to the device. Examples of nonmechanical inputs include, but are not limited to, the following:

1. Electric field.
2. Magnetic field.
3. Temperature field.

In the preferred embodiment of the present invention, the valve means that controls the characteristics of the blown stream is coupled to a piezoelectric bending actuator (piezoelectric bender). Upon application of a control voltage, the bender flexes to manipulate the valve means and, in turn, to control the discharge of compressed air from the plenum. The advantage of a piezoelectric material actuator for this purpose is that it has a very short response time. Thus, the valve and the blowing can be controlled precisely and rapidly. This makes the present invention particularly suitable for use in conjunction with helicopter rotor blades, where rapidly cycled modification of lift characteristics is required.

The control mechanism of this invention is compact, involves only a small number of moving parts, and is simple and reliable in construction. Thus, the entire control mechanism can easily be housed within a helicopter rotor blade, aircraft wing, or other aerodynamic structures. Further, a succession of controllers of this invention can, if desired, be located along a rotor blade or wing so that blowing can be controlled independently at various spanwise position along the blade. Such variable control is not practically possible with mechanical or other prior art blowing control schemes.

Thus, an improved method and apparatus for controlling the blowing from a wing or rotor blade to modify its aerodynamic characteristics is now provided. The method and apparatus addresses and solves the problems of the prior art by eliminating the need for complex mechanical control mechanisms. The use of piezoelectric material actuators to control the valving mechanism provides for rapid and reliable blowing control. This is a vast improvement over plenum pressure control schemes. Finally, control of the piezoelectric actuator through the application of control voltages renders the present system uniquely compatible with a fly-by-wire design. The blowing control can be integrated quite easily into a system in which the blowing is continuously monitored and controlled to produce optimum lift characteristics and fast response to changing conditions.

These and other objects, features, and advantages of this invention will become more apparent upon review of the detailed description set forth below taken in conjunction with the annexed drawings, which are briefly described as follows.

DETAILED DESCRIPTION OF THE INVENTION

Figure 1:
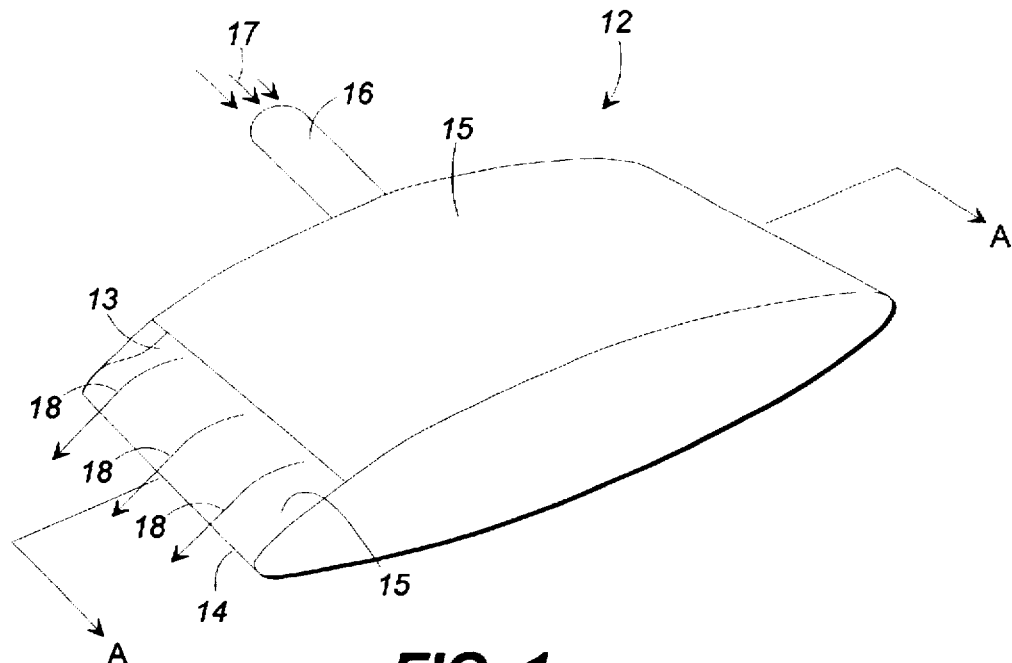
FIG. 1 is a perspective illustration of a section of a rotor blade or wing that embodies the principles of the present invention in a preferred form.
Figure 2:
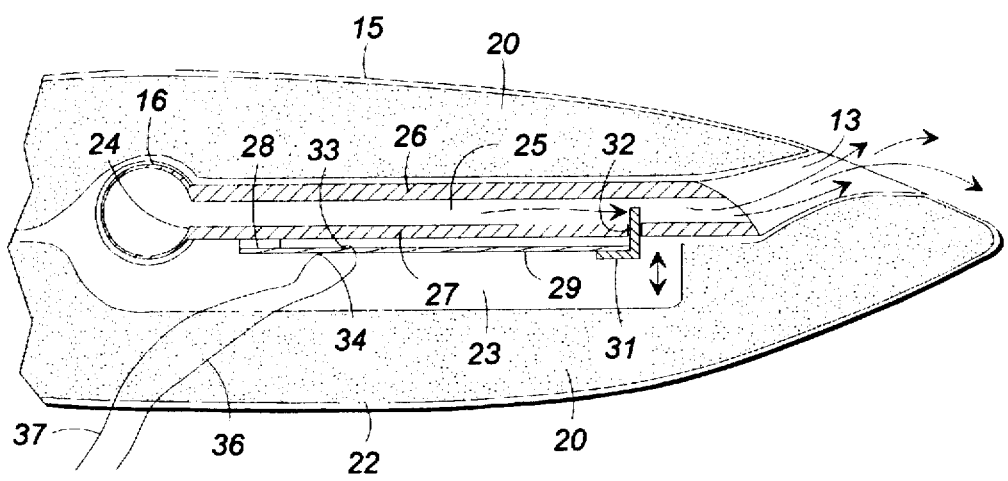
FIG. 2 is a sectional view taken along line A—A of FIG. 1 illustrating one preferred smart material based control mechanism for implementing the method of this invention.

Referring now to the drawing figures, in which like reference numerals designate like parts throughout the several views, FIGS. 1 and 2 illustrate one preferred apparatus and method for implementing the present invention. It should be noted that the illustrated embodiment makes use of this invention as applied to a helicopter rotor blade. Further, the detailed description of the illustrated embodiment will also be presented in the context of a helicopter rotor blade. However, even though the invention is particularly suited to use with helicopter rotors, the scope of the invention is far from limited to such applications. It is equally applicable, for example, to the wings and control surfaces of fixed wing aircraft, to control blowing from fuselage sections of aircraft and, indeed, to control fluid blowing from the control surfaces of submarines. It even has application in steering jets of air from nozzles and in vectoring the blowing of air from wings and rotors to form fluid flaps. Thus, it will be understood that the illustrated preferred embodiment is presented and discussed herein for ease and clarity of explanation, but that the invention is not limited in scope to the illustrated embodiment. One further point to be made is that the description of the preferred embodiment that follows represents an accurate description of a proof-of-concept device, built within technological and financial constraints. As such, some of the features and design elements, although preferred, reflect the choices of material and processing techniques available at the stage of proof-of-concept. A commercial production system obviously would include additional elements required by mechanical constraints of an operating aircraft, however the basic principles disclosed and claimed herein would be embodied in a commercial system.

FIG. 1 illustrates a short section of a helicopter rotor blade 12. It will be understood that the complete rotor blade is much longer than the illustrated section and normally extends from the hub of the helicopter to a distal end. The illustrated section is presented for clarity of presentation. A narrow slot 13 extends spanwise on the upper surface near the trailing end portion the blade. If the entire rotor blade were depicted, the slot 13 preferably would run spanwise for substantially the entire length of the rotor blade. As one skilled in the art will recognize, the length of the slot may be varied in accordance with the demands of a specific application. Furthermore, one skilled in the art will recognize that an elongated slot is not the only aperture configuration possible for use with the present invention. For example, a plurality of small holes or a series of short slots could be used effectively. For this reason, the present invention is not intended to be, nor should it be, limited to only the use of a single, long slot in the surface of the blade.

While not critical to the invention disclosed, the narrow slot 13 is located in the upper surface 15 of the rotor blade section less than one-half chord distance from trailing edge 14. The location of the slot 13 along the surface of the rotor blade section 12 could dramatically affect the flow around the blade and thus its lift characteristics. The present invention is not intended to be limited only to the preferred embodiment and a blowing slot at virtually any location on the rotor blade surface is possible and falls within the scope of the invention.

The trailing edge portion 14 of the rotor blade section 12 is formed into a smoothly curved Coanda surface. A compressed air supply conduit 16 extends within and along the length of the blade and forms a plenum that supplies pressurized air, depicted by arrows 17, to the interior of the rotor blade section 12. While pressurized air is used for the blowing fluid in the preferred embodiment to match the ambient air in which the rotor blade functions, other blowing media such as inert gas or even liquid mists are possible. However, air is preferable because of its availability and distribution.

The pressurized air 17 is provided to the conduit 16 from an appropriate source, such as a compressor. This is, however, not the only possible source of compressed fluid and the present invention is in no way limited to any specific source of compressed fluid. For example, a compressed fluid caption located at the tip of the rotor blade could feed the plenum at a pressure equal to the blade tip free-stream total pressure, with the benefit of mechanical simplification. This compressed air is fed in the plenum tube 16 until ejected, by application of this invention, through the narrow slot 13, as depicted by arrows 18. Pressurized air emitted or blown from the slot 13 will pass along the trailing edge of the upper surface 15 to the trailing edge 14 thereof. At the trailing edge, the air stream will follow the trailing edge 14 Coanda surface until centrifugal force causes separation of the stream from the skin of the rotor blade section 12. As discussed above, this has the effect of shifting the stagnation points on the blade and modifying the air flow patterns about the blade to control its aerodynamic characteristics.

The present invention is a method and device for controlling the blowing from the slot 13 using a smart material actuator. FIG. 2 shows a side sectional view of the rotor blade section of FIG. 1 cut along the sectional arrow AA thereof and illustrates a preferred embodiment of the present invention. The rotor blade 12 is formed with an upper surface 15 and a lower surface 22. The upper and lower rotor blade surfaces define the aerodynamic shape of the rotor blade and also form an interior cavity 23. The upper surface is interrupted at the rear end portion of the blade to define a spanwise slot 13 therein. More specifically, the upper surface terminates just short of the trailing edge of the blade. The lower surface 22 wraps around the trailing edge of the blade to form a smooth Coanda surface 14 and then extends beneath the terminated edge of the upper surface 15. This configuration forms the spanwise slot 13 as shown in FIG. 2. Preferably, the interior cavity of the blade is at least partially filled with a light strong material 20 that strengthens the blade and further defines the contour of the slot 13; however, such a filler is not a requirement.

Housed in the blade cavity 23 is the compressed air supply conduit 16, which functions as a plenum for the compressed air. The conduit 16 is formed from an elongated cylindrical tube, although any suitable shape may function equally well in the present invention. An aperture in the form of a longitudinally extending slot 24 is formed in the tube 16 such that the pressurized air 17 held in the tube 16 may pass through the slot 24. The slot 24 preferably extends substantially for the entire length of the conduit 16; however, shorter slots or individual spaced slots are possible.

Attached and sealed with a suitable adhesive to the conduit 16 at a location directly above the slot 24 is an upper plate 26. The upper plate 26 preferably is fashioned from a thin, rigid, light-weight material such as plexiglass or aluminum. In the preferred embodiment, the upper plate 26 is rectangular with a length substantially corresponding to the span of the rotor blade. However, in other embodiments, the length of the upper plate 26 may be modified as desired to suit a particular purpose. The upper plate 26 extends from the conduit 16 to the vicinity of the spanwise slot 13.

Attached with a suitable adhesive to the conduit 16 directly below the slot 24 and spaced from the upper plate 26 is a lower plate 27. Just as with the upper plate 26, the lower plate 27 preferably is formed of a rigid, light-weight material and fashioned into a thin, rectangular shape with a length substantially corresponding to the span of the rotor blade. The length of the lower plate 27 is the same as the length of the upper plate 26. The lower plate 27 also extends from the conduit 16 to the vicinity of the spanwise slot 13.

The upper and lower plates 26 and 27 are positioned in spaced parallel relationship with respect to each other to form a narrow passageway 25 that communicates between the slot 24 in the conduit 16 and the slot 13 in the surface of the rotor blade. Thus, pressurized air can be delivered from the conduit 16 to the slot 13 through the passageway 25 for ejection of the compressed air through the slot 13. In addition, a series of spaced apart partitions are preferably located along the passageway 25. These partitions extend transversely relative to the rotor blade and divide the passageway 25 into discrete sections spaced along the blade. Each of these discrete sections can then be independently controlled according to the present invention to tailor the blowing of air from the slot 13 as a function of position along the blade and thus to modify air flow around the blade to control its lifting properties.

The illustrated embodiment shows use of the present invention in conjunction with a single section of the passageway 25. It will be understood, however, that this arrangement in a typical application likely will be repeated along the length of the blade with possibly numerous adjacent ones of the discrete sections of the passageway 25. The number of discrete sections provided along the length of a rotor blade is discretionary with one skilled in the art and depends upon the design goals and purposes of the blade. In fact, a single passageway extending along the length of a blade could be appropriate in certain applications. The invention is not limited to any one size or number of discrete controllable passageway sections.

A narrow slit 32 is fashioned in the lower plate 27. This slit 32 spans one of the discrete sections of the passageway. The spacing of the slit 32 from the conduit 16 is not critical to the invention. However, in the preferred embodiment, the slit 32 is positioned some relatively small distance from the end of the lower plate 27 and adjacent to the blowing slot 13.

Securely attached by a suitable adhesive to the underside of the lower plate 27 adjacent to the conduit 16 is a spacer block 28. The spacer block 28 can be a thin rectangular member with a length approximately equal to the width of the discrete section. Alternatively, the spacer block 28 could just as effectively be fashioned to be a rectangular member spanning the length of the entire rotor blade. On the lower side of the spacer block 28 is attached one end of a piezoelectric bender 29 in the form of a rectangular leaf. In the present embodiment, the leaf 29 has a width corresponding to the width of the slit 32 in the same lower plate 27 to which the spacer block 28 and leaf 29 is attached. This is, however, not a requirement and any width or size or shape of actuator is within the scope of the present disclosure. The length of the leaf 29 is approximately a length adequate to span the distance from the spacer block 28 to the slit 32 in the lower plate 27.

A rigid L-shaped shutter member 31 is fixed by one of its legs to the free end of the piezoelectric leaf 29. The other leg of the shutter member 31 protrudes through the slit 32 in the lower plate 27 and into the passageway 25. The length of the shutter member 31 corresponds to the length of the slit 32 though which it passes. The width of the second leg of the shutter member is sufficient to span the space between the upper and lower plates 26 and 27 when the shutter member moves through the slit 32. In this way, communication through the passageway can be selectively closed off or opened up by moving the shutter member into and out of the slit 32 respectively. In addition, communication through the passageway can be only partially restricted, if desired, by moving the shutter member part way through the slit 32.

Attached and electrically connected to the leaf 29 are an upper electrode 33 and lower electrode 34. These electrodes are connected by an upper electrode wire 36 and a lower electrode wire 37 respectively to a controllable voltage source (not shown in FIG. 2). The piezoelectric leaf 29 is selected so that it exhibits a bending behavior when actuated by a control voltage. That is, when a control voltage is applied across the electrodes, the leaf 29 bends so that its free end moves upwardly with a frequency, amplitude, and modulation pattern corresponding to that of the control voltage. When the control voltage is removed, the leaf 29 returns to its original flat configuration. The effect is to move the distal end of the leaf up and down as indicated by arrows 30 in FIG. 2.

As the leaf 29 bends upward, the second leg of the shutter member 31 moves through the slit 32 and into the passageway 25 formed by the upper plate 26 and the lower plate 27. As the leg of the shutter member moves into the passageway 25, communication through the passageway becomes restricted. When the leg moves completely into the passageway, so that it comes into contact with the upper plate 26, communication through the passageway 25 is completely closed off. Conversely, when the leg of the shutter member 31 moves out of the passageway 25, communication through the passageway is opened. Thus the shutter member 31, which, in turn, is controlled by the piezoelectric member 29, effectively controls the flow of compressed air from the conduit 16, through the passageway 25, and out of the slot 13.

Thus, it will be seen that the present invention provides a means for controlling the blowing of compressed air from a slot in a helicopter rotor blade to control the aerodynamic properties of the blade. The method and control device of the invention employs a shutter that can be selectively inserted into the air passageway through which compressed air is delivered from a supply conduit to a blowing slot in the blade. Thus, the shutter acts as a valve that can shut off air flow through the slot 13, open up air flow, or, if inserted only part way into the passageway, limit or restrict the flow. The valve is coupled to a piezoelectric leaf that, when excited by application of a control voltage, bends to move the shutter into and out of the passageway. Because the piezoelectric leaf responds fast to the application or removal of control voltage, the stream of compressed air from the slot in the blade can be modulated rapidly through application of a modulated control signal. In fact, it has been found that cycles of up to 60 per second or more are easily achievable, depending upon actuator design and construction. Accordingly, the present invention is uniquely suited for use in a helicopter rotor blade as an alternative to the traditional swashplate, which rapidly but mechanically varies the angle of attack of the blades. Replacement of the swashplate mechanism with blowing control as embodied in the present invention would significantly reduce the weight, complexity, and maintenance requirements inherent in mechanical systems such as swashplates. In addition, there is no swashplate system able to vary the angle of attack of a blade selectively both as a function of time and as a function of location along the rotor blade. The present invention easily accomplishes this function when a plurality of independently controllable valve mechanisms of this invention are spaced along the length of the blade.

The embodiment illustrated herein makes use of air passageways controlled by a shutter driven piezoelectric bender to achieve control over the aerodynamic forces acting upon a wing or rotor blade section. The actuator output displacement is sufficient to shut off completely the air flow from the slot 13.

Similarly, in another embodiment, the piezoelectrically actuated valve could be removed and a piezoelectrically actuated member substituted as one of the walls of the passageway. In such a configuration, the piezoelectrically actuated wall could be displaced into the passageway in order to restrict the cross-sectional area of the passageway. Thus, the compressed air flow through the passageway would be restricted or eliminated by actuation of the smart material passageway wall.

All these configurations overcome a common difficulty with proposed smart material actuators used to achieve flow field modification by directly and mechanically changing the exterior shape of the wing structure to which the said actuators are attached or within which the said actuators are embedded. When using smart material activators for such direct mechanical control, piezoelectric materials are fast to respond, but exhibit very small maximum straining or movement under the effect of the input voltage. Shape memory alloys exhibit larger strains, but are slow to respond due to inherent long time constants associated with heat transfer processes needed for temperature changes. As a consequence, attempts to use smart material actuators to obtain actual and rapid structural deformations significantly equivalent to movable trailing edge surfaces have not produced any practical results.

The present invention capitalizes on the idea that the small displacements characteristic for smart material actuators are on the same order of magnitude with the passageway sizes used for blowing, while the forces needed in the process of partially or completely obstructing the blowing flow can be small enough to be overcome by the said actuators, as illustrated by the preferred embodiment of the present disclosure. Therefore, in addition to the preferred embodiment of the invention disclosed here, the use of any smart material actuators, as defined in the present document, in any configuration or combination to achieve the same effect of modulating the blowing flow in intensity or direction (vectoring of the blowing jet) falls within the scope of the present disclosure. As an example of an embodiment for vectoring a blowing jet, a cylindrical plenum having a longitudinal slot could be telescopically received in an outer cylindrical baffle with a corresponding slot. A piezoelectric bender actuator could then be operatively coupled to rotate the outer baffle slightly to align or misalign the slots, thus opening up and shutting off the air stream, respectively. With such an embodiment, partial movement of the outer baffle could function to simultaneously modulate the intensity of the blowing and, at the same time, vector, or change the direction of, the compressed air jet. Again, the outer surface of the outer cylinder functions as a Coanda surface and is essential in significantly changing the direction of the jet. Large angles of jet deflection can be achieved in response to small relative rotations of the concentric cylinders, compatible with smart material actuator outputs and using small forces that can be generated by the said actuators. The vectored jet of air could be ejected from the trailing edge of a wing or blade, forming what is known in the art as a fluid flap, and ultimately influencing the characteristics of the flow field around the wing or rotor blade.

The advantage of smart material actuators and particularly piezoelectric material actuators over mechanical systems is reduced weight, reduced complexity, and increased efficiency and reliability. In addition, use of the present invention in a helicopter rotor blade provides the possibility of control cycles beyond rates otherwise achievable. The present invention has the potential to be used in noise and vibration level reduction applications, where the required fast and distributed variation of flow characteristics could be not achieved by the use of current art. Additionally, the important decline in mechanical complexity of the rotor system could render helicopters much more cost-effective to operate and maintain. As mentioned above, blowing control as a function of position along the blade is made relatively simple by the control system of this invention, whereas such control is simply not possible with prior art control schemes.

In certain other applications of the present invention, it may be desirable to employ a smart material actuator to control the fine relative movement of a device manufactured as a sieve-like screen superimposed on another sieve-like screen. These two screens could be used such that output of the smart material actuator would cause one screen to shift relative to the other. In essence, a variable-porosity wall would be created by such a screen system. Once again, a smart material would be used to modify and/or control the air flow associated with blowing or suction through an aerodynamic surface.

It should also be observed that piezoelectric materials are not the only type of smart material that could be used in the present invention. Other smart materials, as defined in this document, could be used advantageously in certain other embodiments. Therefore, the present invention is not intended to be, nor should it be, limited to any particular smart material, even though a piezoelectric actuator has been illustrated in the preferred embodiment.

It will be apparent to one of skill in the art the many variations and modifications may be made to the preferred embodiment as described above without substantially departing from the principles of the present invention. All such variations and modifications are intended to be included herein and within the scope of the present invention, as set forth in the following claims.

Wherefore the following is claimed:

1. An apparatus for ejecting a controlled stream of fluid from a slot formed in the surface of an aerodynamic structure to control the aerodynamic properties of the structure, said apparatus comprising a source of fluid to be ejected from the slot, a passageway communicating between said source of fluid and the slot for delivering a flow of fluid to the slot, a shutter cooperatively associated with said passageway, said shutter being movable between a closed position at least partially disposed in said passageway and closing off communication therethrough and an open position retracted from said passageway and opening up communication therethrough, and an actuator coupled to said shutter for selectively moving said shutter between its open position and its closed position, said actuator being constructed of smart material that causes said actuator to deform and move said shutter toward one of its positions in response to application of a predetermined control voltage, and to return to its undeformed configuration to move said shutter toward the other one of its positions upon removal of the control voltage, whereby the shutter can be selectively positioned within the passageway to control the rate of flow of fluid therethrough and thus control the rate of ejection of fluid from the slot upon application of appropriate control voltages to the actuator, said apparatus further comprising and upper plate and a lower plate, said upper and lower plates extending between said source of fluid and the slot and being spaced apart from each other to define said passageway between said upper and lower plates, at least one of said plates being formed with a slit through which said shutter moves into and out of said passageway.

2. An apparatus for ejecting a controlled stream of fluid from a slot formed in the surface of an aerodynamic structure as claimed in claim 1 and wherein said shutter has a first portion that moves in and out of said passageway and a second portion that protrudes from said slit, said second portion of said shutter being secured to said actuator.

3. An apparatus for ejecting a controlled stream of fluid from a slot formed in the surface of an aerodynamic structure as claimed in claim 2 and wherein said shutter is generally L-shaped having a first leg and a second leg, said first leg of said shutter extending through said slit and said second leg being attached to said actuator.

4. An apparatus for ejecting a controlled stream of fluid from a slot formed in the surface of an aerodynamic structure as claimed in claim 3 and wherein said actuator is configured as a leaf having opposed end portions and being constructed to bend upon application of a control voltage, one end portion of said leaf being attached to said second leg of said shutter and the other end portion of said leaf being fixed whereby the shutter is moved into and out of the passageway as said actuator bends and relaxes in response to changing control voltages to control the flow of fluid through the passageway.

5. An apparatus for ejecting a controlled stream of fluid from a slot formed in the surface of an aerodynamic structure as claimed in claim 4 and wherein said other end portion of said leaf is attached to one of said plates at a position spaced from said slit.

6. An aerodynamic control structure comprising a body having a control surface, a slot formed in said control surface for the ejection of a fluid to control the aerodynamic properties of said control structure, a fluid reservoir within said control structure, means forming a passageway communicating between said fluid reservoir and said slot, valve means operatively associated with said passageway, said valve means being movable between a first position closing off communication through said passageway and a second position opening up communication through said passageway, and an actuator coupled to said valve means for moving said valve means selectively between its first position and its second position, said actuator being constructed of a smart material that deforms in response to the application of a control signal and relaxes from its deformed configuration upon removal of the control signal, said actuator moving said valve means progressively between its first and second positions as the actuator deforms and relaxes in response to appropriately applied control signals, said fluid being air and said means forming a passageway comprising a top plate and a bottom plate spaced apart from each other to define said passageway therebetween, said valve means comprising a shutter adapted to move into said passageway to close off communication therethrough and to move out of said passageway to open up communication therethrough, one of said plates being formed with a slit and wherein said shutter extends through said slit to move into said passageway.

7. An aerodynamic control structure as claimed in claim 6 and wherein said shutter has a first end portion and a second end portion with said first end portion moving into and out of said passageway and said second end portion protruding from said slit in said plate, said actuator being attached to said second end portion of said shutter to move said shutter between its first position and its second position upon application of appropriate control signals to said actuator.

8. An aerodynamic control structure as claimed in claim 7 and wherein said shutter is generally L-shaped with one leg of the shutter extending through said slit and with the other leg of the shutter protruding from said slit, and wherein said actuator has a first end attached to the protruding leg of said shutter and a second end fixed with respect to said shutter, said actuator flexing and relaxing in response to application and removal of a control signal to move said shutter between its first position and its second position.

9. An aerodynamic control structure as claimed in claim 8 and wherein said smart material from which said actuator is constructed comprises a piezoelectric material that reacts to application of a control signal.

* * * * *